July 19, 1927.
G. F. MICHAEL
BRAKE OPERATING MEANS
Filed Oct. 11, 1926
1,636,526
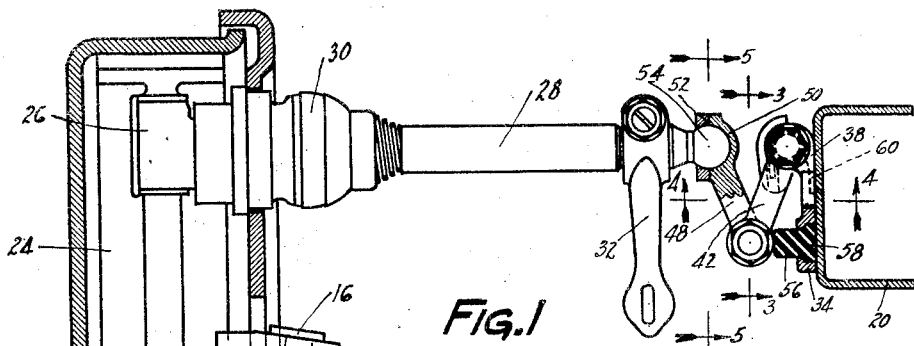
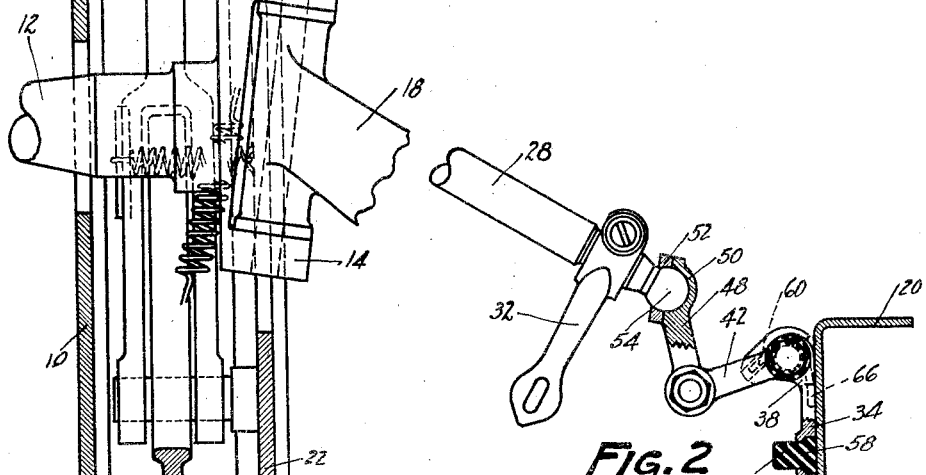
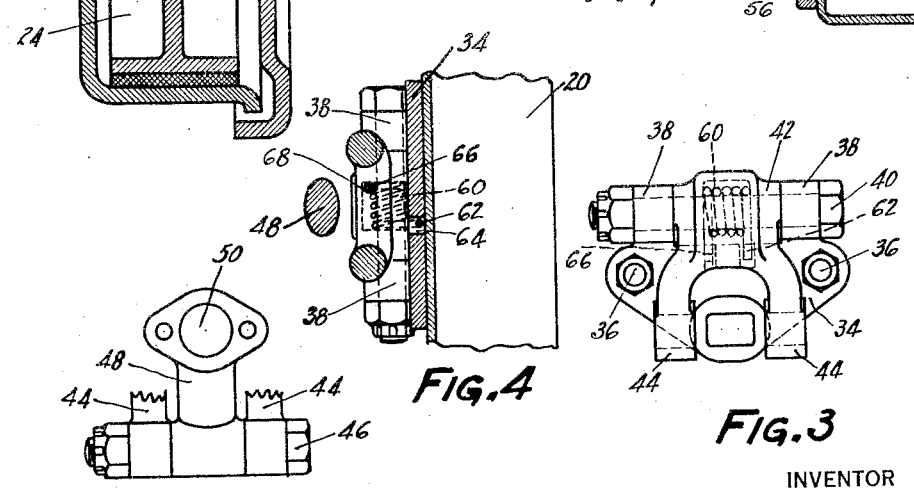
INVENTOR
GUS F. MICHAEL
BY
M. W. McConkey
ATTORNEY Patented July 19, 1927.

1,636,526

UNITED STATES PATENT OFFICE.

GUS F. MICHAEL, OF SOUTH BEND, INDIANA, ASSIGNOR TO BENDIX BRAKE COMPANY, OF CHICAGO, ILLINOIS, A CORPORATION OF ILLINOIS.

BRAKE-OPERATING MEANS.

Application filed October 11, 1926. Serial No. 140,750.

This invention relates to brakes and is illustrated as embodied in novel operating means for a brake on a front or other swivelling wheel. An object of the invention is to provide simplified means for supporting one end of the usual brake-operating shaft, including two members, one of which moves to compensate for ordinary movement of the shaft as the vehicle springs are distorted, while the other one is capable of movement to compensate for excessive distortion of the springs. In one desirable arrangement, the two members are pivotally connected and the one which compensates for normal spring movement is universally jointed to the end of the shaft and freely moves with the shaft. I prefer to provide a spring or equivalent means normally yieldingly resisting the movement of the second member which compensates only for excessive spring movement. In the particular arrangement shown in the drawings, the second member is yieldingly held in an idle position determined by a block of rubber or other stop which serves as a bumper determining the idle position of that member. The two members may be carried as a separate unit or subassembly pivoted or otherwise mounted on a bracket carrying the rubber stop and adapted to be bolted or otherwise secured to part of the spring-supported automobile chassis.

The above and other objects and features of the invention will be apparent from the following description of one illustrative embodiment shown in the accompanying drawing, in which:

Figure 1 is a vertical section through one front brake and associated parts showing the brake control in rear elevation but with the novel support partly broken away in vertical section;

Figure 2 is a view corresponding to the right-hand part of Figure 1 but showing the positions of the parts when compensating for excessive spring movement;

Figure 3 is a section on the line 3—3 of Figure 1, but with the freely-movable shaft-supporting member removed and showing the yieldingly-held member in elevation;

Figure 4 is a section through the novel support and through the side chassis frame member on the line 4—4 of Figure 1; and Figure 5 is an elevation of the freely-movable supporting member and part of the yieldingly-held supporting member looking in the direction of the arrows 5—5 in Figure 1.

In the arrangement selected for illustration, the brake includes a drum 10 rotating with a wheel (not shown) which is mounted on a spindle 12 of a front wheel knuckle 14 swivelled by a king-pin or the like 16 at one end of the front axle 18 which, with a rear axle (not shown), supports through the medium of the usual vehicle springs a chassis frame 20. The open side of the drum 10 is shown closed by a suitable backing plate 22 carried by a knuckle 14. The brake proper includes friction means such as shoes 24 operated by a cam 26 or the like actuated by a shaft 28 through a suitable universal connection 30 which is above and substantially in line with the king-pin 16. The brake may, if desired, be substantially as described in Patent No. 1,567,716, granted Bendix Brake Company on December 29, 1925, on an application filed by A. Y. Dodge. The present invention relates to a novel support for the chassis end of the shaft 28, and which is shown connected to the end of the shaft just beyond the arm 32 by which the shaft is operated.

The device in the form shown includes a bracket 34 secured by bolts 36 or other suitable means to the chassis member 20 and formed at its upper end with lugs 38 having horizontally-alined openings for a pivot bolt 40 passing through the lugs and through a corresponding opening in the upper end of a supporting member 42. Member 42 is forked at its lower end to form a pair of arms 44 having horizontally-alined openings in their lower ends for a pivot bolt 46 connecting the supporting member 42 to a freely-movable upwardly-extending member 48 pivoted on the central part of the bolt 46 and formed at its upper end with a semi-spherical socket 50 which, with a cap 52, receives a ball 54 on the end of the shaft 28, thus forming a universal connection with the end of the shaft. The lower end of one of the two supporting members 42 or 48, in the illustrated instance the lower end of the member 48, is arranged to engage a stop such as a rubber bumper 56 passing through an opening in the bracket 34 and having an enlarged head 58 seated in a socket or recess in the back of the bracket so that it is confined between the bracket and the chassis member 20. It is urged against the stop 56, to prevent movement of the supporting member 42, by means such as a torsion spring 60 sleeved on the central part of the pivot bolt 40 and having one end 62 seated in a socket 64 in bracket 34 while the other end 66 is seated in an opening 68 in the supporting member 42.

By the above-described arrangement, the supporting member 42 is normally yieldingly held stationary in a position determined by the stop 56, while the supporting member 48 is freely movable to compensate for movements of the shaft 28 caused by ordinary distortion of the springs supporting the chassis frame 20. In case of an excessive movement due to distortion of the springs, however, instead of there being any risk of breakage, the second supporting member 42 can move against the resistance of a torsion spring 60 to the position shown in Figure 2.

While one illustrative embodiment has been described in detail, it is not my intention to limit the scope of the invention to that particular embodiment or otherwise than by the terms of the appended claims.

I claim:

1. Operating means for a brake opposite a chassis part comprising, in combination, a brake-applying shaft having one end adjacent the chassis part, a supporting member pivotally mounted on the chassis part opposite the end of the shaft, and a second supporting part pivotally connected to the unpivoted end of the first supporting part and universally supporting the end of said shaft.

2. Operating means for a brake opposite a chassis part comprising, in combination, a brake-applying shaft having one end adjacent the chassis part, a supporting member pivotally mounted on the chassis part opposite the end of the shaft, a second supporting part pivotally connected to the unpivoted end of the first supporting part and universally supporting the end of said shaft, and means normally yieldingly holding one supporting part from movement while permitting the other to move, so that normal shaft movements are compensated for by movement of said other part while both parts may move in case of excessive shaft movement.

3. A brake-shaft support comprising, in combination, a movable shaft-supporting part, a movable supporting part for the shaft-supporting part, and means yieldingly holding one supporting part from movement while permitting the other to move, so that normal shaft movements are compensated for by movement of said other part while both parts may move in case of excessive shaft movement.

4. A brake-shaft support comprising, in combination, an arm having at its first end a universal support for the shaft, a second arm pivoted at its first end to the second end of said first arm, and a supporting part on which the second end of the second arm is pivoted.

5. A brake-shaft support comprising, in combination, an arm having at its first end a universal support for the shaft, a second arm pivoted at its first end to the second end of said first arm, a supporting part on which the second end of the second arm is pivoted, and a spring resisting movement of said second arm.

6. A brake-shaft support comprising, in combination, an arm having at its first end a universal support for the shaft, a second arm pivoted at its first end to the second end of said first arm, a supporting part on which the second end of the second arm is pivoted, a stop, and a spring urging the second arm to a position determined by the stop.

7. A brake-shaft support comprising, in combination, an arm having at its first end a universal support for the shaft, a second arm pivoted at its first end to the second end of said first arm, a supporting part on which the second end of the second arm is pivoted, a resilient bumper carried by the supporting part, and a spring urging the second arm to a position determined by the bumper.

8. A brake-shaft support comprising, in combination, a bracket having a stop device at one side, a member pivoted at the other side of the bracket and extending toward the stop device, another member jointed to the unpivoted end of the first member and extending away from the stop device and terminating in a universal support for the shaft end, and a spring urging the first member toward an idle position determined by the stop device.

9. A brake-shaft support comprising, in combination, a bracket, a member pivoted at one side of the bracket and extending toward the other side, and another member jointed to the unpivoted end of the first member and terminating opposite its pivoted end in a universal support for the shaft end.

10. A brake-shaft support comprising, in combination, a bracket having an opening at one side and a recess on its back communicating with the opening, a rubber block having a head in the recess and extending through the opening, and a movable shaft support mounted on the bracket and engaging the rubber block.

11. A brake-shaft support comprising, in combination, a bracket having an opening at one side and a recess on its back communicating with the opening, a rubber block having a head in the recess and extending through the opening, a movable shaft support mounted on the bracket, and means urging a portion of the support against the block.

12. A brake-shaft support comprising, in combination, a bracket having an opening at one side and a recess on its back communicating with the opening, a rubber block having a head in the recess and extending through the opening, a movable shaft support mounted on the bracket, and means urging a portion of the support against the block, said support having another portion carrying the shaft end and movable therewith while the first portion is held by said means.

13. A brake-shaft support comprising, in combination, a bracket having a pivot at one side and a stop at the other, a device mounted on the pivot and arranged to carry the end of a shaft, and a torsion spring about the pivot urging said device toward the stop.

14. A brake-shaft support comprising, in combination, a bracket having a pivot at one side and a stop at the other, a device mounted on the pivot and arranged to carry the end of a shaft, and a torsion spring about the pivot urging said device toward the stop, said device including a part movable with the shaft to compensate for normal shaft movements, and another part normally held by the spring but movable against the resistance of the spring to compensate for excessive shaft movements.

In testimony whereof, I have hereunto signed my name.

GUS F. MICHAEL.